(12) United States Patent
Lang et al.

(10) Patent No.: US 6,334,330 B2
(45) Date of Patent: Jan. 1, 2002

(54) IMPINGEMENT COOLER

(76) Inventors: Gary Dee Lang, 24365 Woodhall Ct., Naperville, IL (US) 60564; Theodore Hall Gasteyer, III, 916 Secretariat Dr., Naperville, IL (US) 60540; Yeu-Chaun Simon Ho, 2623 Charlestowne La., Naperville, IL (US) 60564

(*) Notice: Subject to any disclaimer, the term of this patent is extended or adjusted under 35 U.S.C. 154(b) by 0 days.

(21) Appl. No.: 09/766,961

(22) Filed: Jan. 22, 2001

Related U.S. Application Data

(63) Continuation of application No. 09/359,907, filed on Jul. 26, 1999, now abandoned.

(51) Int. Cl.[7] ............................................. F25D 17/02
(52) U.S. Cl. ..................................... 62/374; 62/380
(58) Field of Search .................................. 62/374, 380

(56) References Cited

U.S. PATENT DOCUMENTS

| | | |
|---|---|---|
| 2,494,864 A | 1/1950 | Erickson ...................... 62/104 |
| 3,267,585 A | 8/1966 | Futer ............................. 62/63 |
| 3,864,931 A | 2/1975 | Guttinger ........................ 62/63 |
| 3,871,190 A | 3/1975 | Harper et al. ................. 62/380 |
| 3,898,863 A | 8/1975 | Wagner ........................ 62/208 |
| 4,077,226 A | 3/1978 | Strong ............................ 62/63 |
| 4,175,396 A | 11/1979 | Miller et al. .................... 62/63 |
| 4,462,383 A | 7/1984 | Henke et al. .................. 126/21 |
| 4,474,498 A | 10/1984 | Smith ........................ 432/144 |
| 4,479,776 A | 10/1984 | Smith ........................ 432/144 |
| 4,481,782 A | 11/1984 | Mukerjee ....................... 62/63 |
| 4,523,391 A | 6/1985 | Smith et al. .................. 34/225 |
| 4,783,972 A | 11/1988 | Tyree, Jr. et al. ............. 62/374 |
| 4,947,654 A | 8/1990 | Sink et al. .................... 62/186 |
| 4,955,206 A | 9/1990 | Lang et al. ................... 62/186 |
| 5,123,261 A | 6/1992 | Cope ............................. 62/63 |
| 5,168,711 A | 12/1992 | Moore et al. ................... 62/63 |
| 5,365,752 A | 11/1994 | Coffre ........................ 62/374 |
| 5,408,921 A | 4/1995 | Persson et al. ............... 99/143 |
| 5,444,985 A | 8/1995 | Lang et al. ..................... 62/63 |
| 5,467,612 A | 11/1995 | Venetucci .................... 62/374 |
| 5,474,794 A | 12/1995 | Anderson et al. ........... 426/614 |
| 5,509,277 A | 4/1996 | Kiczek et al. ................ 62/374 |
| 5,606,861 A | 3/1997 | Renz ............................. 62/63 |
| 5,694,836 A | 12/1997 | Bievins ....................... 99/517 |
| 5,715,688 A | 2/1998 | Jones, III ...................... 62/63 |
| 5,740,678 A | 4/1998 | Lee et al. ....................... 62/63 |
| 5,765,394 A | 6/1998 | Rhoades ...................... 62/603 |
| 5,868,003 A | 2/1999 | Simas et al. ................. 62/603 |

FOREIGN PATENT DOCUMENTS

| | | |
|---|---|---|
| EP | 0089762 | 9/1983 |
| EP | 11164653 | 5/1997 |
| FR | 975566 | 3/1951 |
| WO | WO9849505 | 11/1998 |
| WO | WO0042869 | 7/2000 |

OTHER PUBLICATIONS

Hampton, "Rapid Cooling Will Produce Safer, Higher Quality Eggs", Press Release, North Carolina State University (1998).

Ovadia et al., "Impingement in Food Processing", Food Technology, vol. 52, No. 4 (1988) pp 46–50.

Egg Cooling Project, Federal Register, 63 F.R. 27502, No. 96 (1998).

*Primary Examiner*—Ronald Capossela
(74) *Attorney, Agent, or Firm*—Donald T. Black

(57) ABSTRACT

A cooling tunnel system that includes a conveyor for carrying objects through a tunnel chamber. The conveyor enables a cooling fluid to pass therethrough and about the objects. A plurality of slot means feeds the cooling fluid to the conveyor means. Each slot means includes at least one aperture for enabling vapor flow onto and about the objects. A plenum adjacent the plurality of slot means distributes the cooling fluid. And at least one fan in the tunnel chamber causes a flow of the cooling fluid into the plenum and through the slot means with sufficient velocity to impinge upon and cool the objects and to recirculate the cooling fluid within the tunnel chamber.

22 Claims, 11 Drawing Sheets

IMPINGEMENT COOLER

This is a Continuation of prior U.S. application(s) Ser. No. 09/359,907, Filing Date: Jul. 26, 1999 abandoned.

FIELD OF THE INVENTION

This invention relates to cryogenic coolers particularly, to a cooling tunnel system that impinges cryogenic fluids for accelerated cooling.

BACKGROUND OF THE INVENTION

Food processors use both cryogenic and mechanical freezers to chill or freeze a variety of food products. Cryogenic freezers typically freeze items to cooler temperatures with rapid cycle times. Unfortunately, these cycle times are inadequate for some applications.

A traditional cryogenic tunnel freezer for cooling foods, such as warm eggs from +95° F. (35° C.) to +45° F. (7° C.), delivers performance on the order of 3,750 BTU's/hr/sq. foot (11,829 W/m$^2$) of active conveyor belt. In order to obtain this performance, using a prior art carbon dioxide cooler/freezer, a 1.5 horsepower (1.1 kW) fan motor is positioned every 4.5 feet (1.4 m) along the length of its tunnel. Since a usable width of conveyor, in this example, is 18 inches (46 cm) or 36 inches (91 cm) wide considering two conveyors in use, each 1.5 horsepower (1.1 kW) fan covers an area of 1,944 square inches (12,500 cm$^2$) or 13.5 square feet (1.2 m$^2$). Dividing 1.5 horsepower (1.1 kW) by 13.5 square feet (1.2 m$^2$) provides a ratio of 0.1111 horsepower per square foot of conveyor (892 W/m$^2$). Accordingly, the prior art obtains 3,750 BTU's per hour (11,829 W/m$^2$) of heat transfer performance per 0.1111 fan horsepower (0.08 kW). More specifically, for every one fan horsepower 0.75 (kW) in the traditional cryogenic tunnel freezer, 33,750 BTU's per hour (9.88 kW) of heat transfer performance are achieved. Furthermore, plant space is a major concern in typical food processing plants, especially egg processing plants that have a fixed configuration due to the egg sorting and packaging equipment already installed. Typically, the above freezer specifications are inadequate to cool eggs with a limited cooler length.

The Agriculture Department and the FDA have recently published an Advanced Notice of Proposed Regulations (ANPR) for the safe handling, labeling and temperature control of table (shell) eggs. This proposed regulation is responsive to public concern for food safety with respect to Salmonella Enteritidis in processed shell eggs. The intent of this rule is to require egg processors to lower the temperature of their shell eggs to an internal temperature of 45° F. (7° C.) prior to shipment. Further, distributors, food service and grocery chains are now demanding even tighter temperature specifications (i.e., 41° F. or 5° C.)

Currently, the favored auxiliary cooling method uses cold storage rooms. Eggs cooled in this manner can take anywhere from 2½ days to 14 days to reach acceptable temperatures while in their packed containers. Since the typical egg processor handles between 750,000 to 1,000,000 eggs per day, the necessary cold storage capacity at these facilities to meet the required temperature specifications is substantial.

In current state of the art cryogenic $CO_2$ food freezer/coolers typical shell eggs (at 101° F. or 38° C.) would need to be exposed to cryogenic conditions for a dwell time of at least 2 minutes. Based on typical production rates in plants using commercially available egg processing equipment, such a cryogenic $CO_2$ cooling unit would have to be a minimum of 20–25 feet (6.1–7.6 m) long to handle the production rate of each packing head. The cooler's packing heads are typically capable of packaging 50 cases containing 30 dozen eggs per hour (1,500 dozen/Hr.). Furthermore, the cooler's long length is necessary to ensure efficient application of the $CO_2$ refrigeration so as to lower the egg temperature from +95° F. (35° C.) to the required +45° F. (7° C.)

However, most processing plants can't accommodate such length of coolers in their processing lines. Further, use of a typical "high performance" cryogenic freezer/cooler configuration for such an application would be unlikely to achieve the necessary heat transfer in the required length and would be cost prohibitive.

Egg cooling has been attempted in the past at two different locations within a typical egg processing plant. It has been attempted to insert a refrigerated egg cooler between the egg washer location and the candler. This proved unsuccessful because the unit needed to be at least 70 feet.(21.3 m) long to provide the necessary cooling at the normal production rates and line speeds. U.S. Pat. No. 5,694,836, to Blevins et al., entitled "MODULAR LOOSE EGG COOLING, STORAGE AND TRANSPORT SYSTEM AND METHOD" addresses the need for cooling of loose eggs by describing a packaging system that enables cooling fluid access thereto during storage. Blevins et al. do not consider in-line processing of packaged and boxed eggs that account for a large part of the market for shell eggs sold to retailers and food service customers.

U.S. Pat. No. 5,474,794 to Anderson et al., entitled "RAPID CHILLING OF SHELL EGGS USING CRYOGENIC GASES" describes the advantages of cryogenic cooling at temperatures between −60° F. (−51° C.) to −120° F. (−85° C.) as a process, but does not discuss specific cryogenic freezer/cooler designs necessary for space efficiency and economic viability.

Other examples of both cryogenic and mechanical freezer designs are described in the prior art that improve various aspects of the freezer's performance, both from throughput and efficiency standpoints. U.S. Pat. No. 3,864,931 to Guttinger, entitled "PROCESS AND APPARATUS FOR FOOD FREEZING", describes a two zone freezing approach where a first freezing zone uses a vertical upward blowing stream of mechanically refrigerated cold vapor through a perforated solid belt to create a fluidized bed effect. A second zone includes vertical jets of cold air that are directed downward through formed slots that are transverse to the food conveyor movement direction. A blower and heat exchanger provide a source of cold gas. The velocity of the cold gas is limited to prevent product from being blown around in the freezer.

Other prior art focuses on the vapor balance of cryogenic freezers/coolers to optimize freezing efficiency. The prime motivation for these designs is to limit air infiltration into the cryogenic enclosure. Room air represents an unnecessary heat load on the system and these patents are directed towards its control and elimination.

Ovadia et al. in "IMPINGEMENT IN FOOD PROCESSING", Food Technology, April 1998, Vol 52, No. 4, p. 46, describe how impingement of cooling vapors on foodstuffs provides advantages over blast freezing. In addition, Ovadia et al. indicate that impingement freezing achieves a similar effect as does blast freezing, but at higher temperatures and lower costs. See also U.S. Pat. No. 4,523, 391 to Smith et al., entitled "HIGH EFFICIENCY IMPINGEMENT HEATING AND COOLING APPARATUS" for a plenum design used in an impingement cooler.

Accordingly, it is an object of this invention to provide an improved cooler that operates with shorter lengths and faster cooling rates.

It is another object of the invention to provide an improved egg cooler that utilizes a cryogenic fluid to accomplish the egg cooling without freezing the interior of the eggs (i.e., yolk and white) or cracking the shell.

It is a further object of the invention to provide an improved egg cooler that utilizes carbon dioxide as a cryogenic fluid in a tunnel egg cooler.

SUMMARY OF THE INVENTION

A cooling tunnel system that includes a conveyor for carrying objects through a tunnel chamber. The conveyor enables a cooling fluid to pass therethrough and about the objects. A plurality of slot means feeds the cooling fluid to the conveyor means. Each slot means includes at least one aperture for enabling vapor flow onto and about the objects. A plenum adjacent the plurality of slot means distributes the cooling fluid. And at least one fan in the tunnel chamber causes a flow of the cooling fluid into the plenum and through the slot means with sufficient velocity to impinge upon and cool the objects and to recirculate the cooling fluid within the tunnel chamber.

DETAILED DESCRIPTION OF THE PREFERRED EMBODIMENTS

This cooling tunnel system is useful for rapidly cooling objects with a shortened tunnel length. It's useful for cooling foods such as, fruits, vegetables, meat and poultry. The tunnel'simply uses an appropriate conveyor belt for each object cooled. The tunnel system is most advantageous for eggs through processors demand effective cooling of eggs through high-velocity packaging lines. Although the cooling system is useful for rapidly cooling multiple objects, the Figures illustrate the cooling tunnel for eggs.

Figure 1:
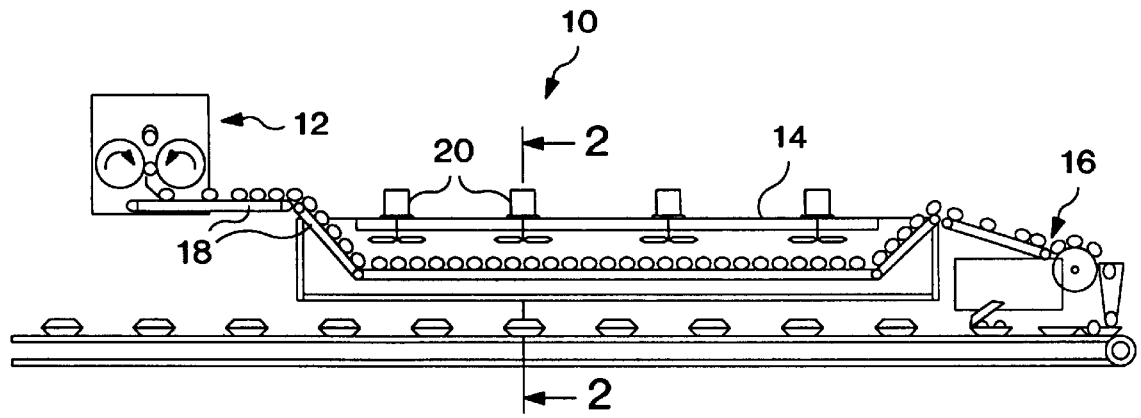
FIG. 1 is a schematic side sectional view of a cooling tunnel incorporating the invention.

In FIG. 1, a cooling system 10 is schematically shown and comprises an egg sorting head 12, a cooling tunnel 14 and a carton loading/closing mechanism 16. A conveyor system 18 receives eggs from sorting head 12 and carries them into cooling tunnel 14 in file arrangements. More particularly, egg conveyor 18 is arranged so that the sorted eggs enter cooling tunnel 14 as a plurality of files and ranks, much like a group of soldiers marching in parallel files.

Egg conveyor 18 is constructed so that the individual eggs are continuously rotated as they are conveyed through cooling tunnel 14. A plurality of fans 20 are positioned within cooling tunnel 14 and enable recirculation of the coolant employed therein. Most advantageously, the conveyor 18 enters and exits through the top of the cooling tunnel 14. This reduces the amount of atmospheric gases, including water vapor, infiltrating into the cooling'tunnel 14.

Figure 2:
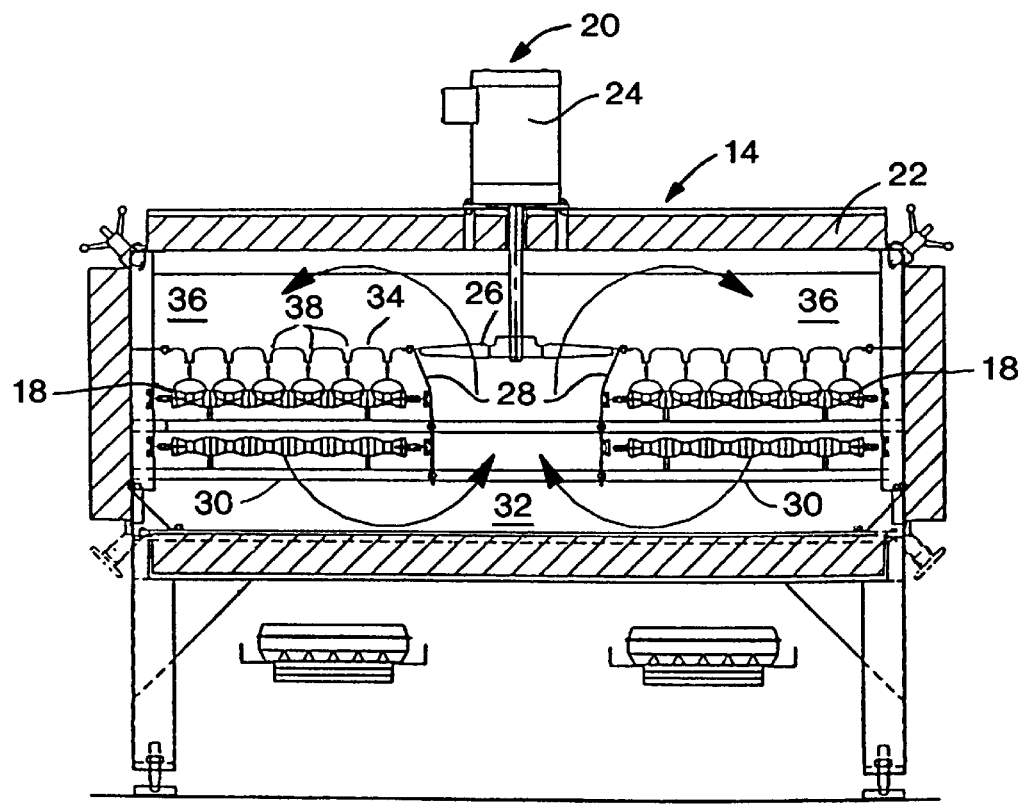
FIG. 2 is a sectional view of FIG. 1 taken along line 2—2, showing internal details of the cooling tunnel.
Figure 3:
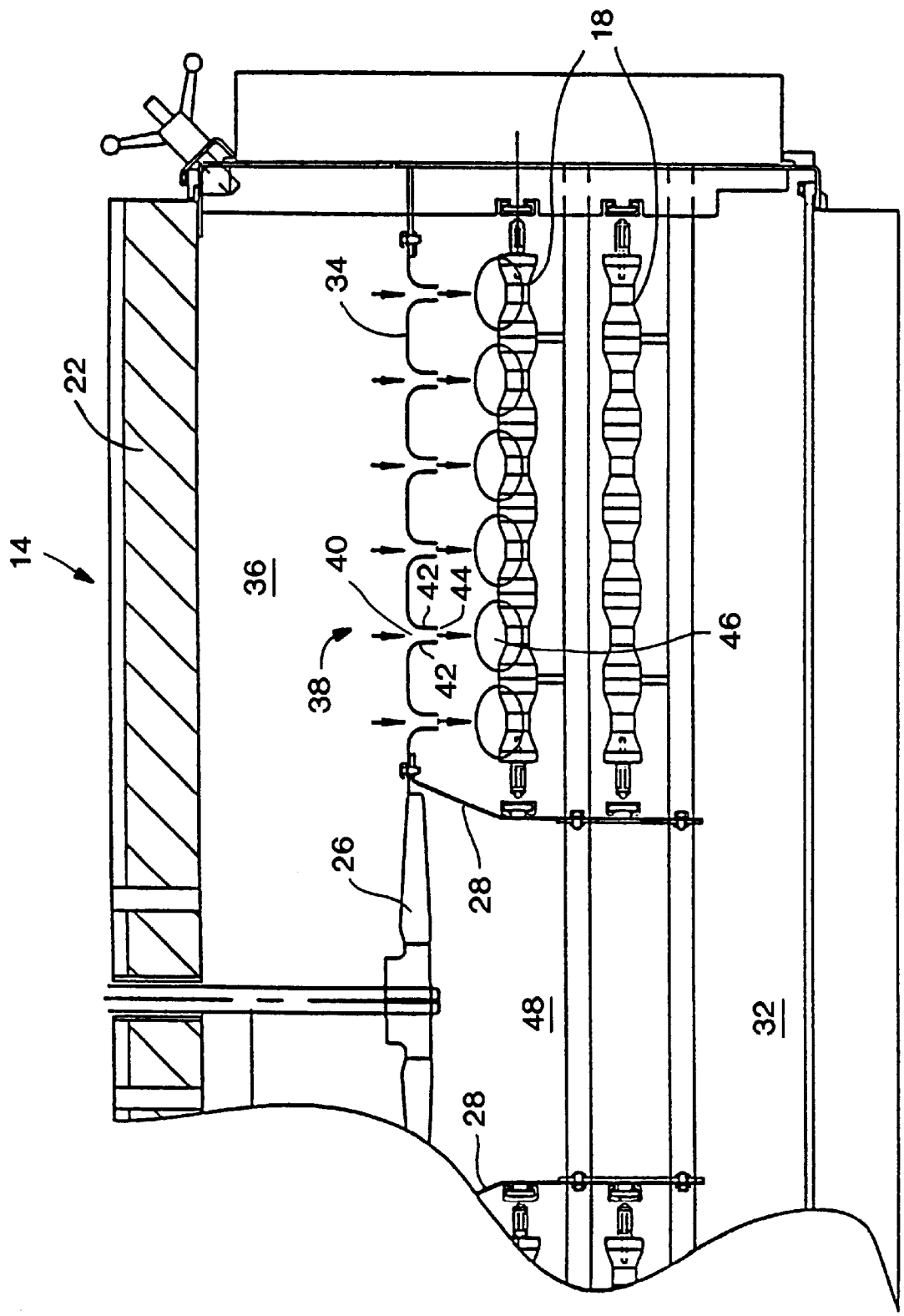
FIG. 3 is an expanded view of the sectional view of FIG. 2.

Referring to FIGS. 2 and 3, details of cooling tunnel 14 are illustrated that are not shown in FIG. 1. More particularly, cooling tunnel 14 comprises a tunnel enclosure 22 on which are mounted a plurality of fan motors 24 which drive fans blades 26. A pair of conveyors 18 are positioned within tunnel enclosure 22 and are identical in structure. Each conveyor 18 is enclosed by a shroud 28 that exhibits: (i) an open bottom portion 30 that communicates with a lower plenum 32; and (ii) a slotted portion 34 that is adjacent to and communicates with an upper plenum 36. Slotted portion 34, comprises a plurality of slots 38, with each slot 38 oriented along and parallel to the length of cooling tunnel 14. When cooling other foodstuffs, the slots may have alternative shapes, such as circular, helical or slotted perpendicular to the belt. Most advantageously, the slots direct and accelerate cooling fluid toward an aligned file of objects traveling on the conveyor 18. Each slot 38 has an opening orifice positioned directly over a file of eggs being moved therebeneath. Slots 38 preferably are comprised of an opening 40 (see FIG. 3) that communicates with a pair of opposed walls 42 that lead to an outlet 44. Outlet 44 is positioned directly over a file of eggs 46 so as to enable a cryogen coolant exiting therefrom to impinge directly upon eggs 46.

As above indicated, conveyors 18 are constructed so as to enable the cryogen coolant to pass therethrough into lower plenum 32. There, under the influence of fan blades 26, the cryogen coolant moves up through flow region 48 and into upper plenum 36, pressurizing upper plenum 36, passing through slots 38 and down past the eggs 46 on conveyor 18.

To achieve proper cryogen snow/vapor velocities through slots 38, the positioning of fan blades 26 is important. It is preferred that fan blades 26 be positioned in approximately the same plane as the plane that defines the upper surface of slotted portion 34 of shroud 28. This positioning enables fan blades 26 to provide a cryogen vapor flow into upper plenum 36 that achieves a substantially uniform cooling across the width of conveyor belts 18.

It has been found that if fan blades 26 and the upper surface of the slotted portion 34 of shroud 28 are raised too high, velocity of the cryogen snow/vapor off the tips of the blades produces a high pressure region at the outermost walls of upper plenum 36. This uneven pressure distribution results in higher vapor velocities flowing through the outermost slots 38, as opposed to the slots 38 that are closest to the fan blades.

In addition to the importance of vertical position of fan blades 26, the width of slots 38, where the high velocity cryogen vapor escapes from upper plenum 36, affects the distribution of the cryogen vapor through the innermost and outermost slots 38. The narrower the slot (i.e., the spacing between walls 42), the more back pressure is created in upper plenum 36. This tends to even out the flow in the system. But if the slots are made too narrow, the back pressure can be too high. This degrades the system's efficiency by demanding higher fan horsepower requirements. In addition, if slots 38 are made too narrow, they may have a tendency to collect water and to eventually plug up with ice. It has been found that slots 38 should exhibit a width of greater than 0.25 inches (0.64 cm).

In the structure shown in FIGS. 1–3, maximum heat transfer is realized when sufficient cryogen snow/vapor velocities impinge on eggs 46 to wipe away the warm boundary layer that normally surrounds eggs passing through cooling equipment. It is preferred that the cryogen snow/vapor velocities escaping from slots 38 fall within a range of about 10 meters per second to 20 meters per second, with a most preferred value being about 15 meters per second. At these flow rates, direct impingement of the cryogen snow/vapor on the eggs is ensured. Furthermore, when the lengths of slots 38 are oriented above associated files of eggs, approximately equal impingement flow velocities are experienced by all eggs in a file.

The distance from outlet 44 of a slot 38 and the top of the eggs to be cooled has a direct bearing on the cryogen snow/vapor velocities seen by the eggs and the rate of cooling thereof. It is preferred that these distances be adjustable and tuned in accordance with the amount of cooling required for the eggs, considering the residence time of the eggs in cooling tunnel 14. The arrangement of slots 38 and the eggs ensures that complete and continuous high velocity cryogen snow/vapor impingement occurs along the entire length of cooling tunnel 14. It is preferred that the residence time of the eggs in the cooling tunnel be less than two minutes and, preferably, 80 seconds or less.

The cooling tunnel 14 operates with cryogenic and mechanical types of refrigeration. When using mechanical types of refrigeration, it is advantageous to add carbon dioxide to the atmosphere. The carbon dioxide appears to protect against egg degradation. Advantageously, the direct impingement of a cryogen such as solid carbon dioxide or liquid nitrogen enhances heat transfer. Referring to FIGS. 4, 4A, 5 and 5A, three methods for the introduction of a carbon dioxide cryogen into the conveyor region will be described.

Figure 4:
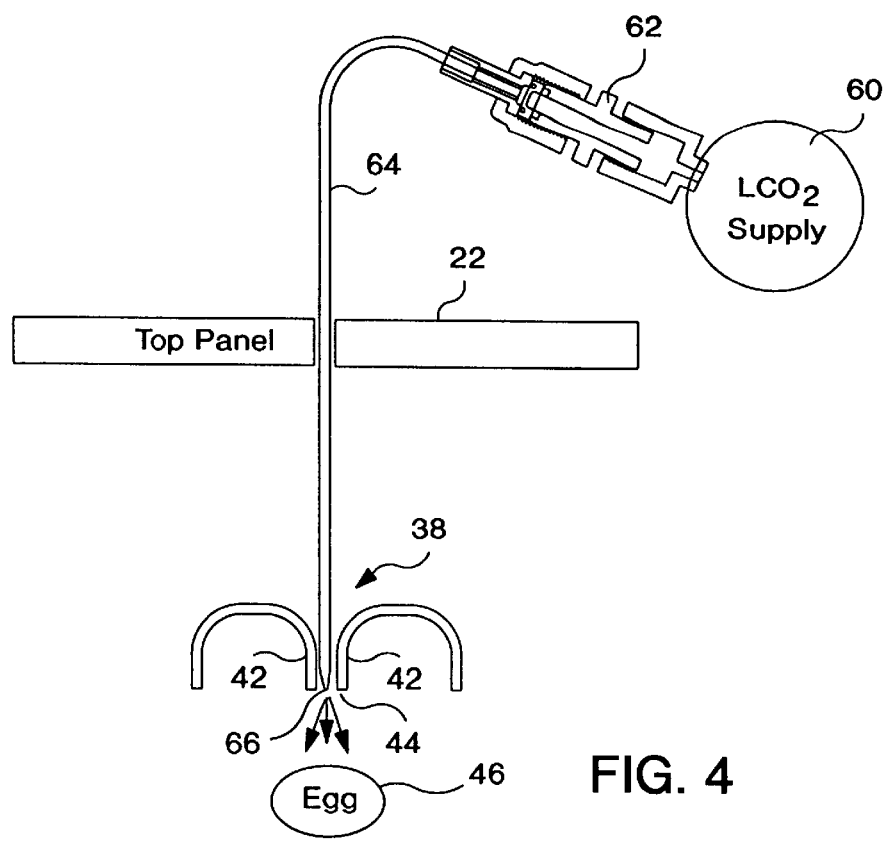
FIG. 4 is an illustration of a cryogen injector, wherein the nozzle of the injector is directly positioned in a slot above a file of eggs.

Referring first to FIG. 4, a conduit 60 carries a liquid carbon dioxide supply. Liquid carbon dioxide is fed to an injector 62 and then into a "snow" tube 64. As the liquid carbon dioxide exits from injector 62, it experiences a first pressure expansion to create a flow of carbon dioxide snow and vapor. A further expansion of the carbon dioxide occurs at ejection end 66 of snow tube 64, which, in this case, is positioned within slot 38 and directly above a file of eggs. Accordingly, a combination of carbon dioxide snow and vapor is directed upon the eggs passing beneath slots 38. The arrangement shown in FIG. 4 maintains the velocity of the carbon dioxide snow/vapor and the resulting higher velocities cause improved heat transfer, but only in a localized region due to the confining effect of nozzle 66.

Figure 4A:
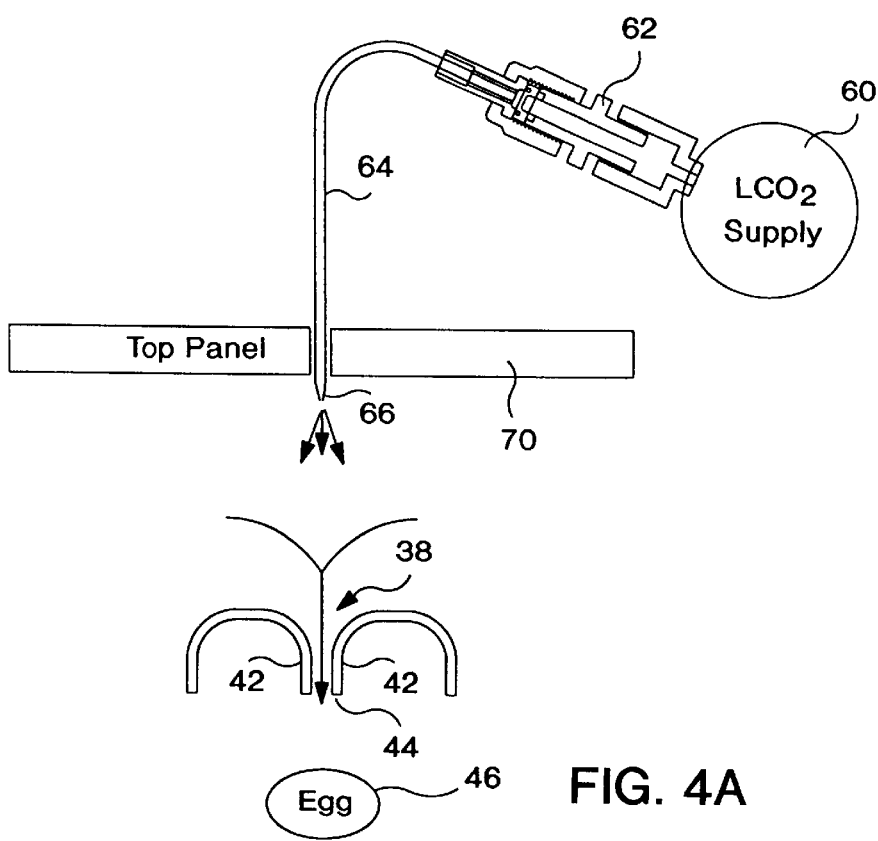
FIG. 4A is an illustration of a cryogen injector, wherein the nozzle of the injector is positioned in a plenum above the slots and the flow of cryogen is aided by fan-generated flow.

Referring to FIG. 4A, the design shown in FIG. 4 has been altered so as to move nozzle portion 66 from within slot 38 and to position it just beneath upper panel 70 of upper plenum 36. This arrangement enables the carbon dioxide snow/vapor to disperse throughout upper plenum 36. Since the carbon dioxide snow is allowed to spread above slots 38, impingement is spread out over a greater linear length of slots 38 than for the arrangement shown in FIG. 4.

While the arrangement of FIG. 4A does not achieve the same impingement velocities as the arrangement of FIG. 4, it does provide more uniform cooling along the entire length of a file of eggs. Velocities of the carbon dioxide snow particles are still substantial, since they are accelerated through slots 38 by fan generated cooling vapor flow.

Figure 5:
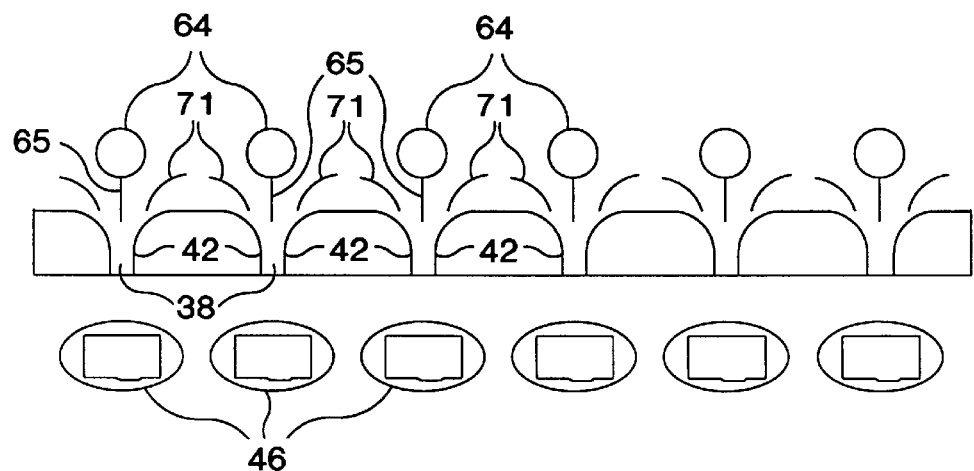
FIG. 5 is a schematic drawing of tubes that inject cryogen adjacent eggs.

Referring to FIG. 5, most advantageously, a series of tubes 64 injects cryogen directly adjacent a plurality of slots 38 and eggs 46. The cryogen exits through a plurality of openings or micro-holes in tubes 64 through the slots 38. These micro-holes inject solid and vapor carbon dioxide in the direction of vector 65. Furthermore the fans (not illustrated) direct the cryogen along vectors 71 into slots 38. Although it is possible to align tubes 64 perpendicular to the direction of the belt or in any other direction, most advantageously, these tubes have a longitudinal axis parallel to the belt's direction.

Figure 5A:
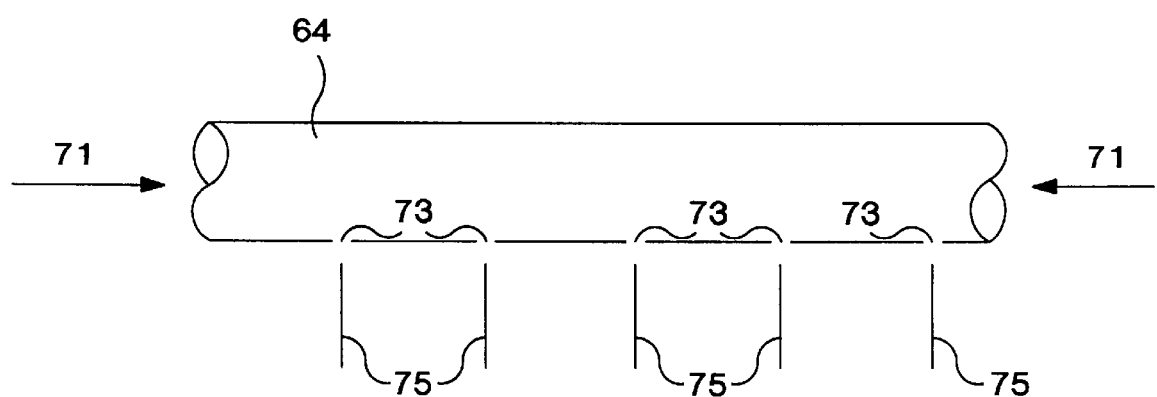
FIG. 5A is a schematic drawing of a tube of FIG. 5.

Referring to FIG. 5A, tube 64 advantageously injects 300 psig (2 MPa) liquid carbon dioxide 71 through a plurality of openings or micro-holes 73 into a plenum having a pressure of 0 psig (0.1 MPa) and forms a stream of solid and vapor carbon dioxide 75. Advantageously, the stream 75 flows toward and directs cryogen at the warm objects, such as food items to improve impingement. The velocity of the stream 75 allows the impingement cooler's fans to operate with a lower speed. This in turn introduces less energy into the cooler and serves to increase the cooler's efficiency. The micro-holes advantageously operate with a diameter of 0.001 in. to 0.050 in. (0.025 mm) to (1.7 mm) and a length of at least three times diameter. Most advantageously, the micro-holes have a 1 inch (2.54 cm) pitch and a diameter of about 0.006 inches (0.015 cm).

It is to be understood that various snow tube configurations can be utilized with this invention. In this regard, U.S. Pat. No. 5,765,394, entitled "SYSTEM AND METHOD FOR COOLING WHICH EMPLOYS CHARGED CARBON DIOXIDE SNOW" discloses a nozzle arrangement wherein carbon dioxide snow and vapor is brought into contact with a conductive surface within the snow tube. The snow thereby achieves a charge as a result of frictional engagement with the conductive surface. A reference potential is applied to the conveyor and attracts the carbon dioxide snow to aid in the impaction thereof on the foodstuffs being cooled.

A further nozzle arrangement is described in co-pending U.S. Pat. No. 5,868,003, entitled "APPARATUS FOR PRODUCING FINE SNOW PARTICLES FROM A FLOW OF LIQUID CARBON DIOXIDE". There a nozzle is described that is provided with a porous member that includes multiple pore-size pathways for passage of liquid carbon dioxide into a region of lower pressure. In the preferred embodiment, the carbon dioxide enters both the solid and vapor phase within the porous member, thereby enabling the solid phase to exit as a fine snow particulate. The disclosure of the two aforementioned patents is incorporated herein by reference.

Figure 6:
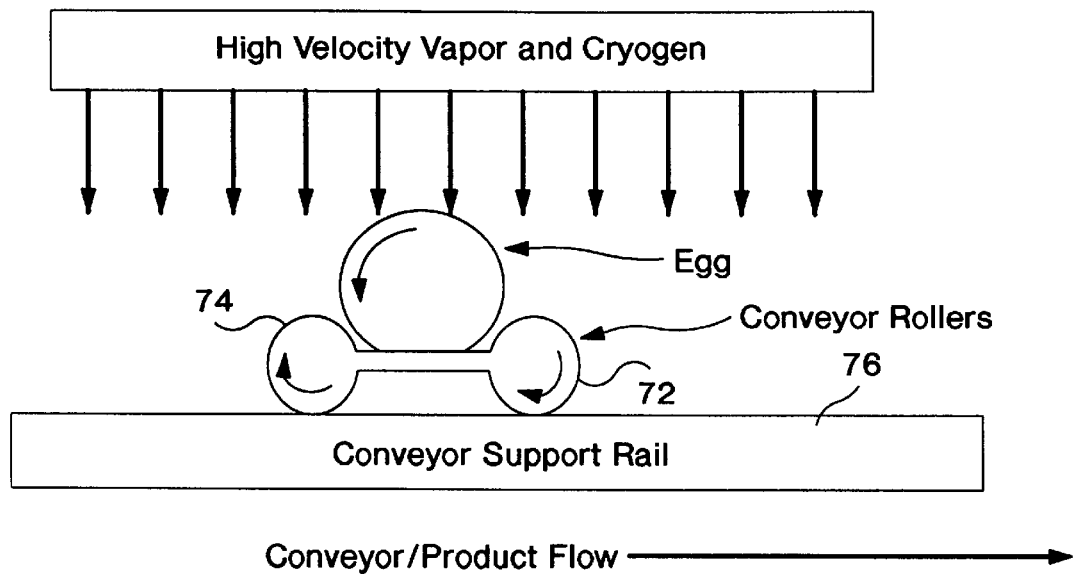
FIG. 6 is a schematic drawing that illustrates the continuous rotation of the eggs by the conveyor within the cooling tunnel.
Figure 7:
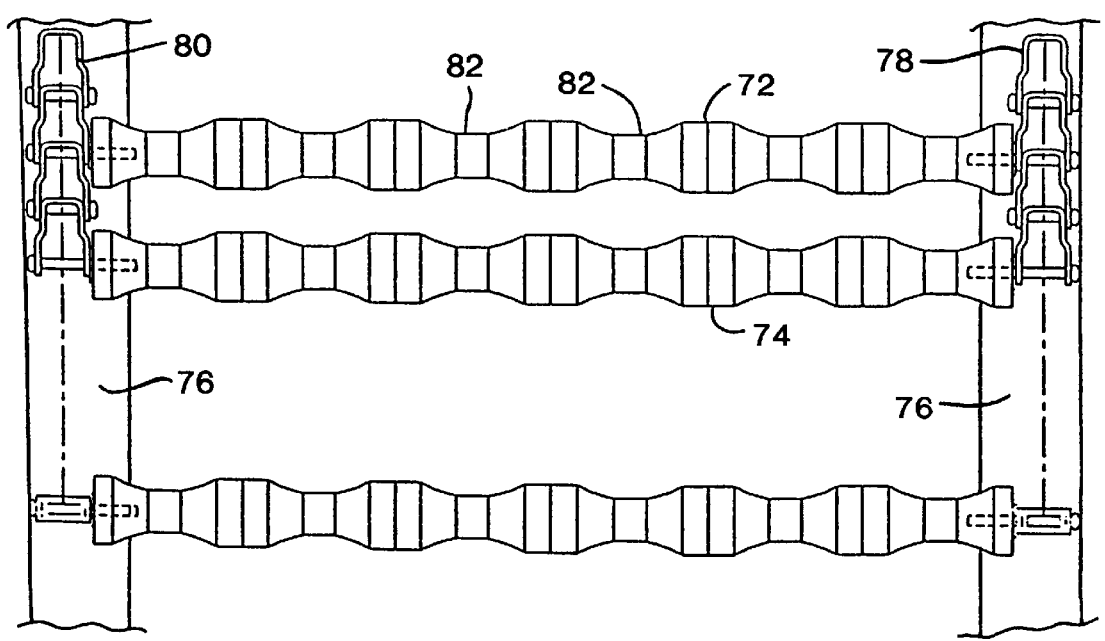
FIG. 7 is a detailed view of a portion of the conveyor showing a preferred design.

Turning now to FIGS. 6 and 7, further details of conveyor 18 will be described. FIG. 6 illustrates a pair of conveyor rollers 72 and 74 that form a portion of conveyor 18. The edges of rollers 72 and 74 are conveyed along support rails 76 and are thereby caused to rotate as they move through cooling tunnel 14. The rotation of conveyor rollers 72 and 74 cause a continuous rotation of eggs supported therebetween throughout the entire length of cooling tunnel 14. Accordingly, all surfaces of the eggs supported by conveyor rollers 72 and 74 are subjected to the high velocity cryogen snow and vapor that exits from slots 38.

FIG. 7 shows further details of rollers 72 and 74 and their method of interconnection via chains 78 and 80. Each conveyor roller includes a plurality of indented regions 82 which, in combination with similarly aligned indented regions 82 of an adjoining conveyor roller, act to support eggs in file and rank arrangements. Chains 78 and 80 are operated to move conveyor rollers 72 and 74 along in lock-step over support rails 76 so that the eggs positioned between indented regions 82 are both confined to their respective files and are rotated as the respective conveyor rollers rotate.

Figure 8:
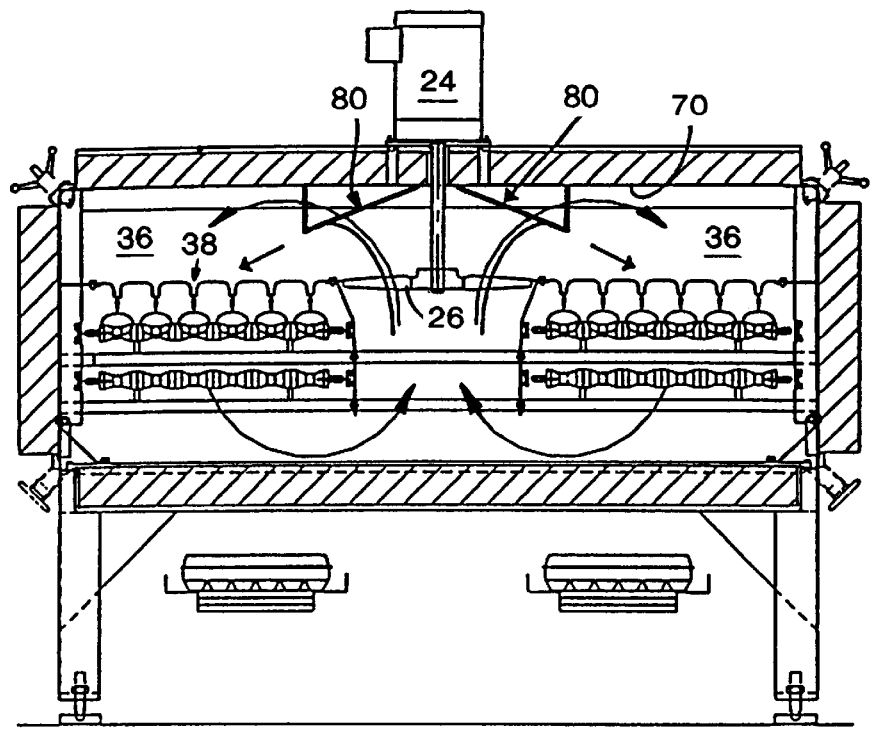
FIG. 8 is a further sectional view of the conveyor showing the use of diverter baffles to enable more directed flows of the cryogen to and through the aligned slots.

Referring to FIG. 8, the arrangement of fan blades 26 and top panel 70 enable the cryogen flow to bounce off panel 70 so that velocities and mass flow are balanced at slots 38. However, to achieve a more precise balance of flows through slots 38, baffles (or spoilers) 80 may be mounted to upper panel 70 directly above the discharge region of fan blades 26. The angles of baffles 80 can be used to divert or bounce the main vapor velocities back towards either the inner slots 38 or the outer slots 38, to balance the flow.

Figure 9:
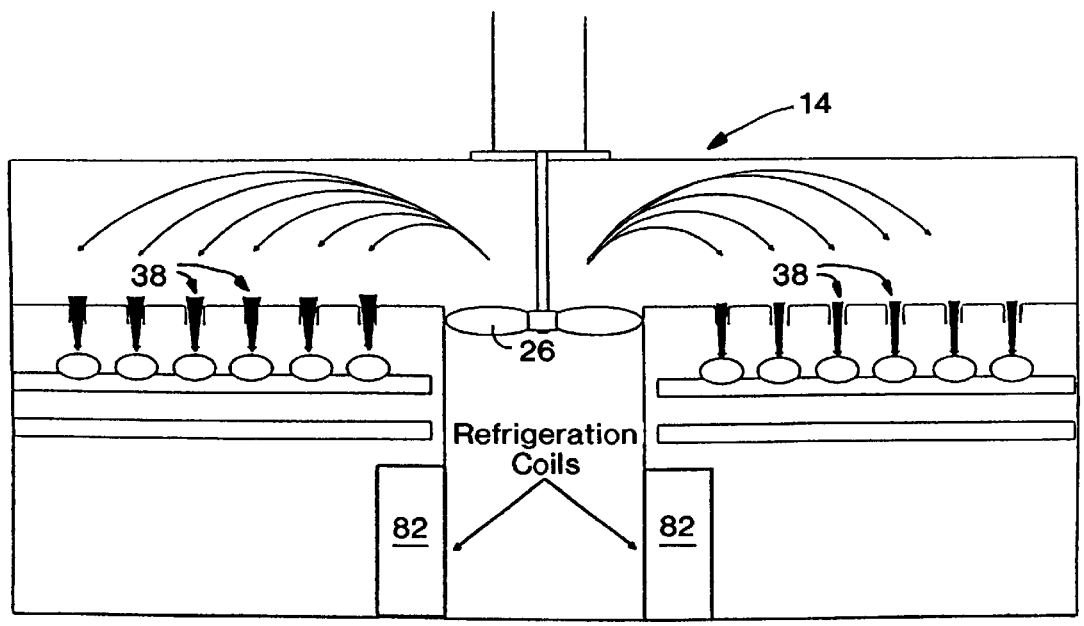
FIG. 9 illustrates an embodiment of the cooling tunnel wherein refrigeration coils are employed to cool the ambient atmosphere within a cooling tunnel, avoiding the need for cryogen injection.

FIG. 9 illustrates an embodiment of the invention wherein, in lieu of the provision of cryogen injection nozzles, a pair of refrigeration coils 82 are introduced into cooling tunnel 14 to provide the source of refrigeration for cooling vapors present therein. Either cooled air or expanded carbon dioxide can be introduced into cooling tunnel 14 and, thereafter, maintained at a cryogenic temperature by the action of refrigeration coils 82, as the vapors are recirculated by fan blades 26.

Figure 10:
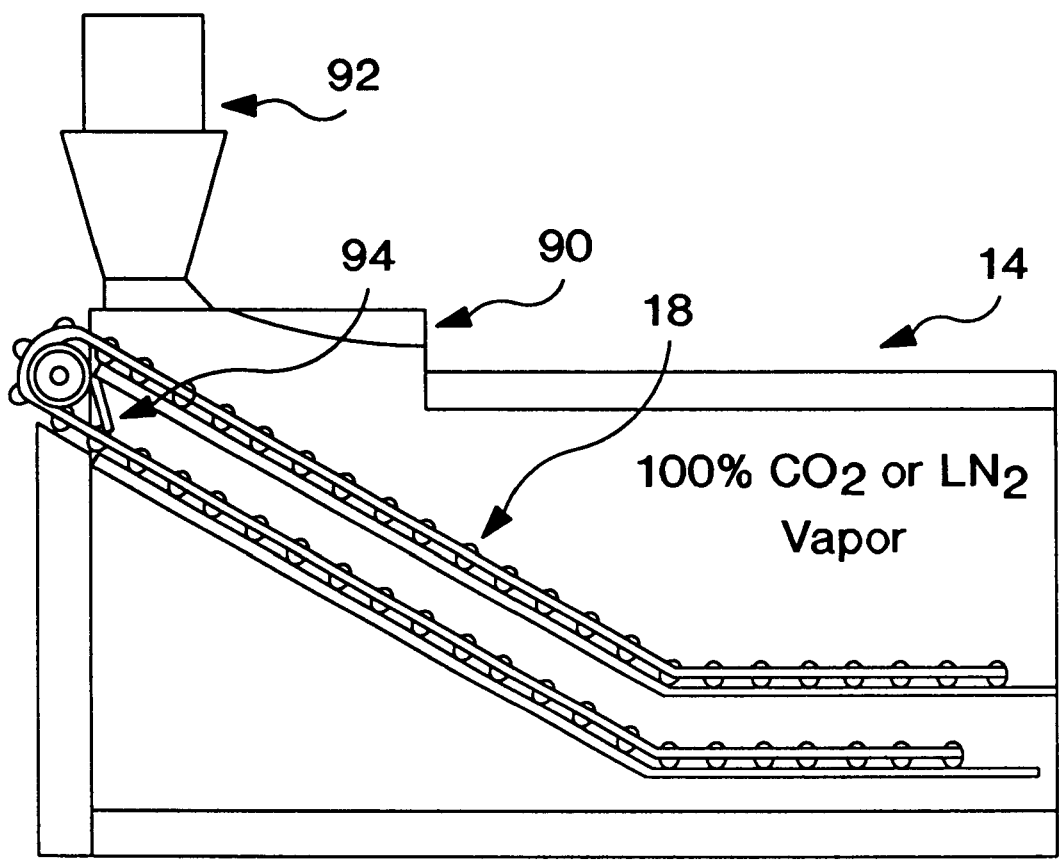
FIG. 10 illustrates a spill-over exhaust system used with the cooling tunnel to minimize ambient air intrusion thereinto.

FIG. 10 illustrates apparatus configurations that both minimize air infiltration into cooling tunnel 14 and allow advantage to be taken of the density of the cold cryogenic vapors and their tendency to pool. As shown in FIG. 10, conveyor 18 enters cooling tunnel 14 via a three-sided vapor dam 90 and then proceeds downwardly into the accumulated cryogenic vapor region. An exhaust pick-up 92 draws cryogenic vapors from within cooling tunnel 14 and prevents an inflow of air thereinto. A baffle 94 is positioned between the upper and lower sections of conveyor 18 to further isolate the interior of cooling tunnel 14 from external air infiltration.

Figure 11:
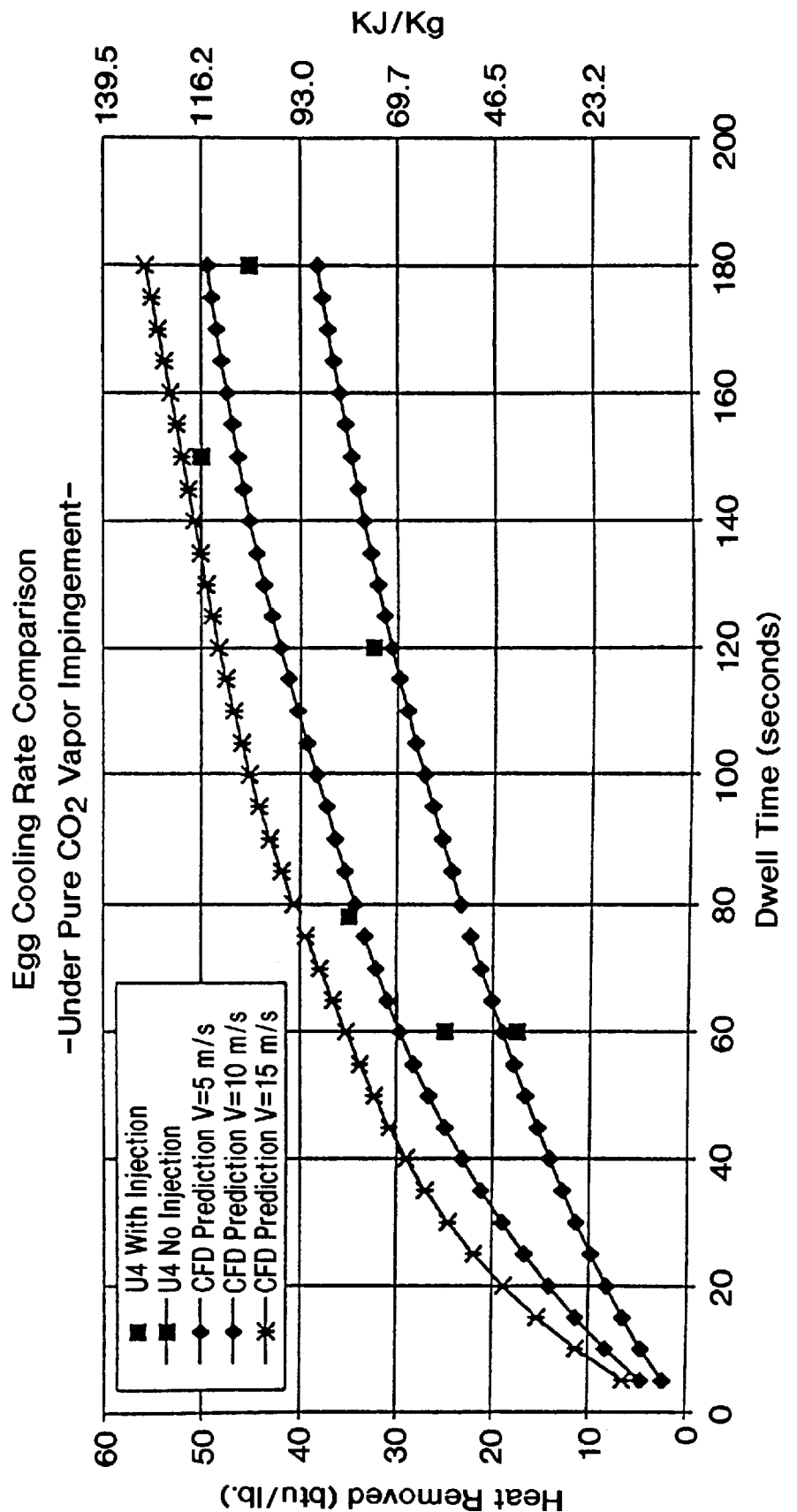
FIG. 11 is a graph showing the projected performance of a cooling tunnel incorporating the invention as compared to a traditional carbon dioxide cryogen tunnel.

FIG. 11 is a graph showing the performance of a cryogenic egg cooling arrangement, as described above, in comparison to a traditional carbon dioxide cooling tunnel (designated "U4"). The graph of FIG. 11 charts heat removed versus dwell time of the eggs within the cooling tunnel. Using a computational fluid dynamics analysis, with cold vapor only and ignoring solid carbon dioxide impingement, curves 100, 102 and 104 are predicted relationships between heat removed and dwell time for vapor flow velocities of 5 meters per second, 10 meters per second and 15 meters per second, respectively. When solid carbon dioxide impingement is considered, the curves should exhibit at least about 10 to 20 percent higher heat removal.

Figure 12:
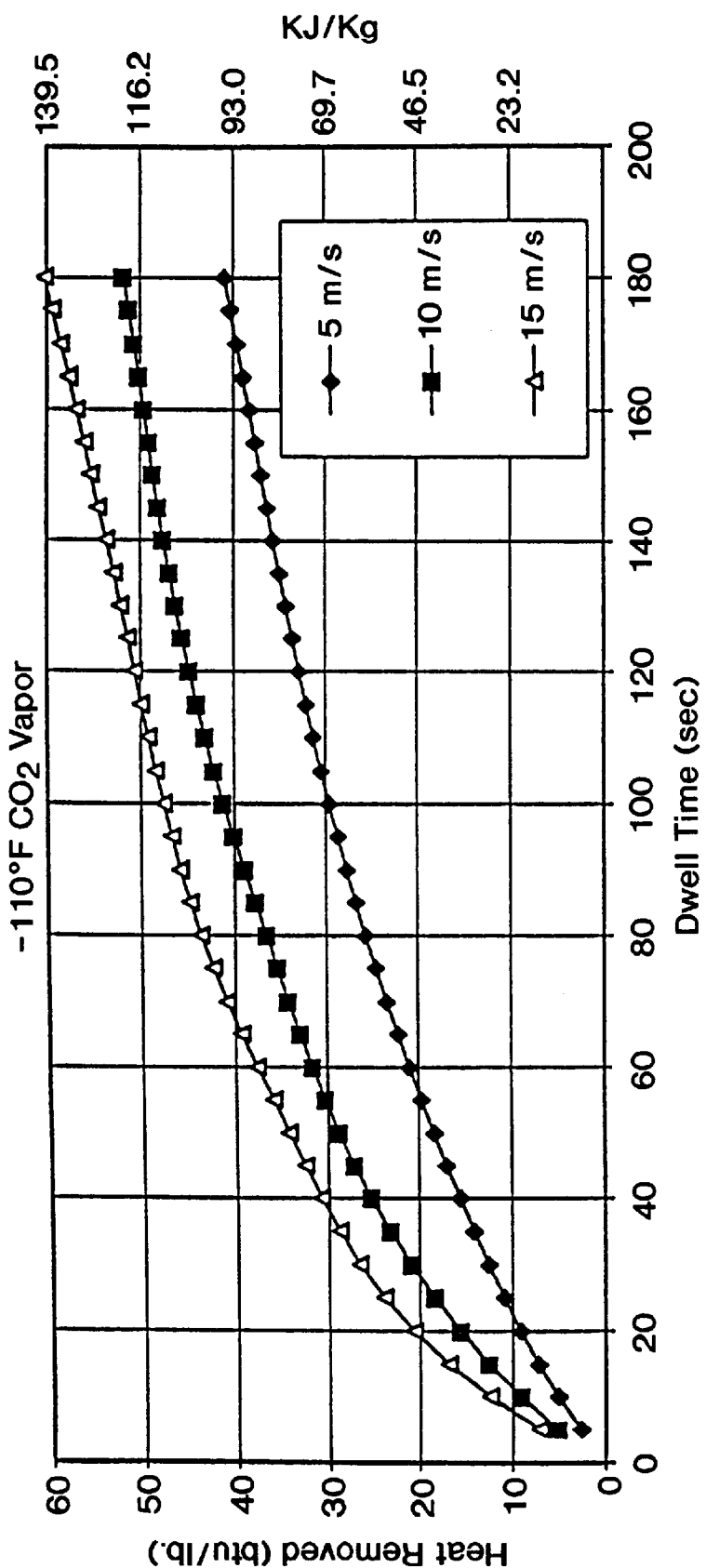
FIG. 12 is a graph of projected data points showing the relationship of impingement vapor velocity speeds versus temperature in a cooling tunnel incorporating the invention.

FIG. 12 illustrates a similar chart to that shown in FIG. 11, except that it is assumed that the carbon dioxide vapor exhibits a temperature of −110° F. (−79° C.).

In addition to air infiltration, there are typically 3 additional areas of concern with respect to cryogenic cooler designs. They are: accumulation of excess cryogen in an inactive area of the cooler; taking advantage of the cold vapor refrigeration value; and fan horsepower requirements.

The major operational problem of a typical cryogenic carbon dioxide freezer is an accumulation of excess amounts of carbon dioxide snow. This accumulation usually occurs in low pressure areas of the freezer (e.g., the freezer floor) due to a lack of vapor flow. Dry ice has a temperature of −109° F. (−79° C.)

Thus, as a freezer's operational temperature drops below −95° F. (−71° C.), there is a tendency to deposit carbon dioxide snow in the lower velocity areas of the freezer. The prior art (e.g., U.S. Pat. No. 5,444,984) has utilized a second set of lower fans to keep the amount of carbon dioxide snow accumulation in check. The invention described above makes efficient use of centrally located fans to address this carbon dioxide snow accumulation problem.

Any snow that falls to the floor of cooling tunnel 14 is subject to exposure to a relatively high velocity vapor flow that moves along the floor of lower plenum 32. This action tends to recirculate any free snow back around through the blower system, through upper plenum 36 and back down through slots 38, directly to the eggs therebeneath.

Note that while the above description describes the use of cryogenic carbon dioxide, the invention is also usable with liquid nitrogen. The design of cooling tunnel 14 and the apparatus present therein makes good use of the available BTU's in the sublimated carbon dioxide or vaporized liquid nitrogen. This is especially true when nitrogen is used because of the high BTU content of the cold vapor. Using high velocity impingement vapor flow, warmer freezer temperatures (e.g., −80° F. (−62° C.) versus −95° F. or (−71° C.)) can be used to obtain similar heat transfer, when compared to those designs that do not have high velocity flows available.

The invention delivers heat transfer on the order of 5,625 BTU's per hour per square foot (17,743 W/m$^2$) of active conveyor belt. This is a 50% increase of heat transfer performance as compared to the traditional cryogenic tunnel freezer example above. A 2 horsepower (1.5 kW) fan motor may be required every 1.5 feet (0.46 m) along the length of cooling tunnel 14 to achieve optimum performance. Calculations similar to those described above will indicate that such an arrangement enables 14,465 BTU's per hour (4.24 kJ) of heat transfer performance for every one fan horsepower (0.75 kW).

EXAMPLE

The objective of this Example was to evaluate the heat transfer performance of impingement egg cooling for test-scale operation.

The pilot tunnel was designed to enable the $CO_2$ vapor to "pool" in the cooling chamber, thus improving performance efficiency. It incorporated the sintered metal injection and linear high velocity vapor nozzle designs. Two separate belts and drives allowed the production from two packing heads to be cooled with separate operating conditions. The active cooling length of the unit was 12 ft. (3.66 m) and the overall length was approximately 15.5 ft. (4.72 m). FIG. 2 shows the cross sectional design of the pilot tunnel.

The parameters that were varied for this series of tests were operating temperature, fan speed and dwell time.

Standard large table eggs were heated in a water bath for at least one hour to about 95° F. (35° C.). Four eggs were used per calorimeter test and were placed across the test belt leaving the innermost and outermost positions empty. Each calorimeter point is an average of the performance across the belt—tests conducted on a 6 ft (1.8 m) prototype tunnel indicated that the egg position across the conveyor was not a significant factor affecting the cooling rate.

For each data point the cooling tunnel operating parameters were set and stabilized, the eggs were carried from the water bath in an insulated box and then placed directly on the conveyor. One side was used for the tests with direct snow impingement and the other operated with only cold vapor. The results of the calorimeter tests are also listed in Table 1.

TABLE 1

COOLING TUNNEL PERFORMANCE TEST
Test Product: Whole Eggs

| TEST | FAN SPEED (RPM) | OPERATING TEMP (C.) | DWELL (SEC) | SOLID + VAPOR IMPINGEMENT OR VAPOR IMPINGEMENT | ΔH (KJ/Kg) |
|---|---|---|---|---|---|
| 1 | 2588 | −68 | 80 | S + V | 78.8 |
| 2 | 3450 | −68 | 80 | S + V | 91.6 |
| 3 | 2588 | −73 | 80 | S + V | 89.5 |
| 4 | 3450 | −73 | 80 | S + V | 105.1 |
| 5 | 2588 | −68 | 98 | S + V | 99.9 |
| 6 | 3450 | −68 | 98 | S + V | 114.4 |
| 7 | 2588 | −73 | 98 | S + V | 104.1 |
| 8 | 3450 | −73 | 98 | S + V | 122.0 |
| 9 | 2588 | −68 | 80 | V | 72.5 |
| 10 | 3450 | −68 | 80 | V | 83.7 |
| 11 | 2588 | −73 | 80 | V | 78.3 |
| 12 | 3450 | −73 | 80 | V | 97.2 |

Figure 13:
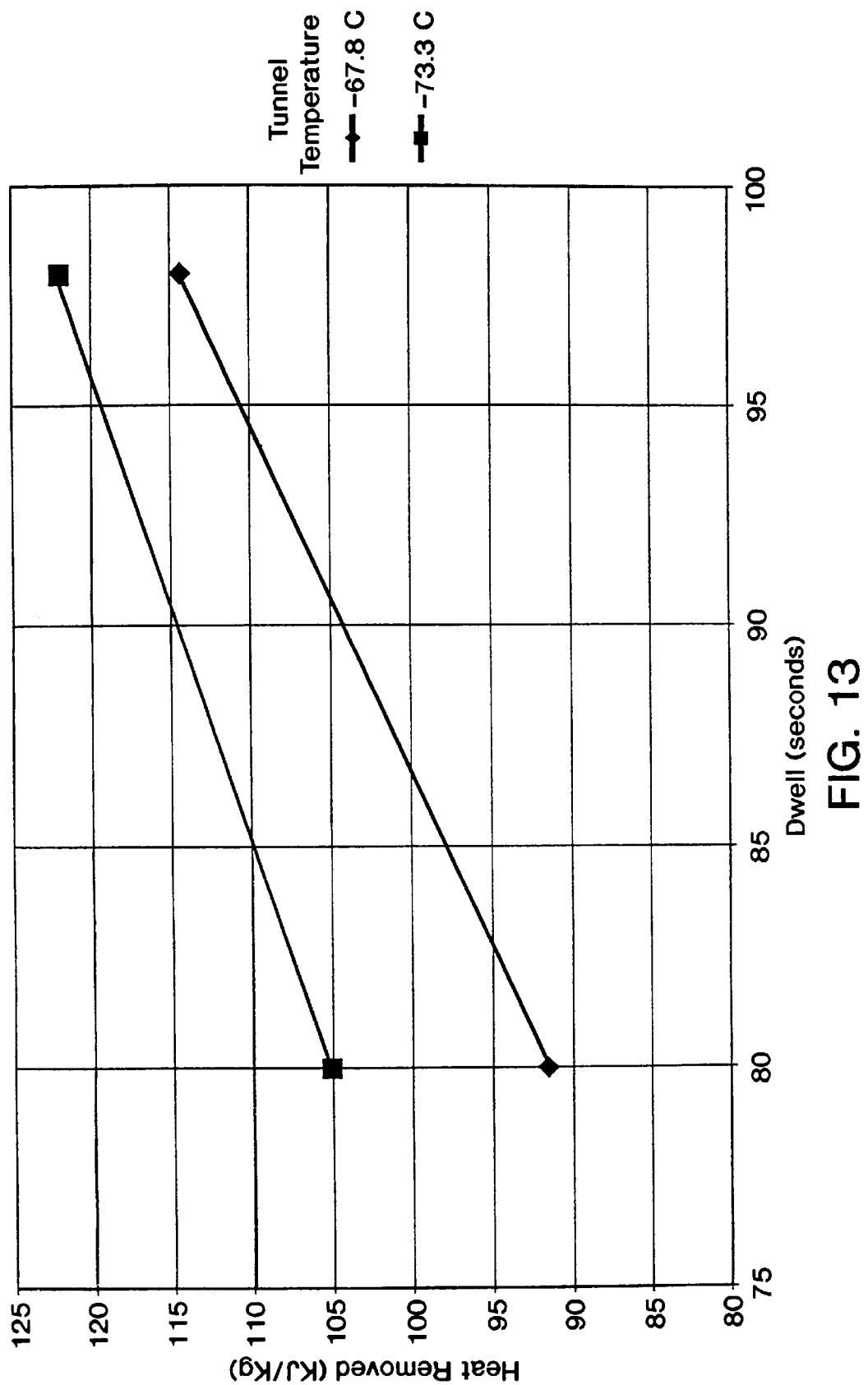
FIG. 13 is a chart that compares heat removed for different dwell times using fans operated at 3450 RPM.
Figure 14:
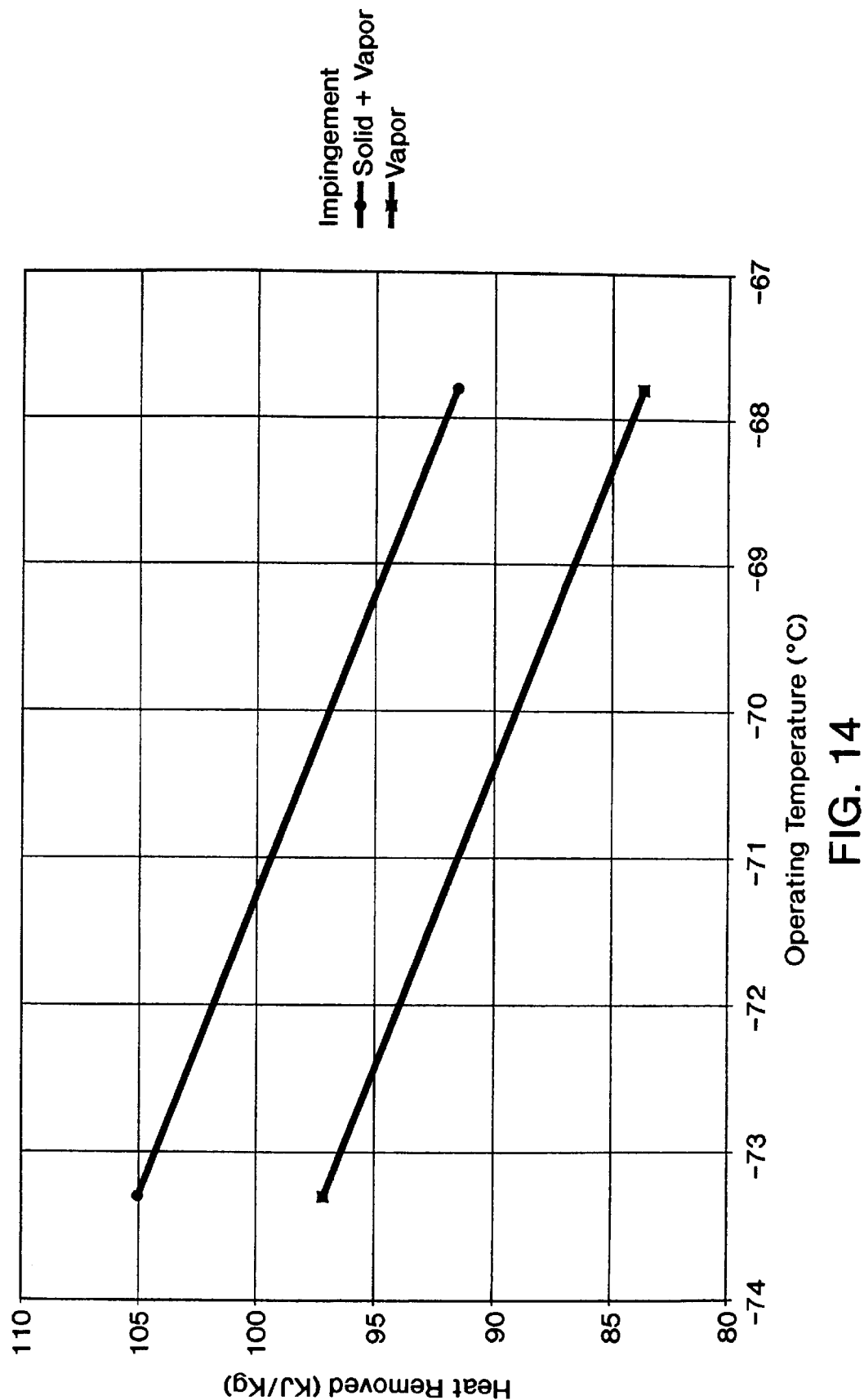
FIG. 14 is a chart of operating temperature versus heat removed for a cooler operated with fans at 3450 RPM for solid and vapor cryogen and vapor cryogen.

The test results are summarized in FIGS. 13 and 14. The heat transfer rates at two operating temperatures with the fans operating at about 100% (3450 RPM) are summarized in FIG. 13. As expected, the data indicate that the rate increases as the operating temperature is lowered— operating at −100° F. (−73° C.) resulted in a faster cooling rate than operating at −90° F. (−68° C.), 77 vs. 89 seconds. This assumed that 44 BTU/lb (102 kJ/Kg) was removed to cool the eggs from 95° F. (3520 C.) to 42° F. (5° C.)—this is considered the maximum.

FIG. 14 confirms an increased heat transfer rate due to direct impingement with solid and gas versus cold vapor. These data indicate an 8 to 9% increase in heat transfer rate results from the direct impingement of solid $CO_2$ plus vapor impingement in comparison to sole $CO_2$ vapor impingement.

It should be understood that the foregoing description is only illustrative of the invention. Various alternatives and modifications can be devised by those skilled in the art without departing from the invention.

What is claimed is:

1. A cooling tunnel system comprising:
   conveyor means for carrying objects through a tunnel chamber, said conveyor means enabling a cooling fluid to pass therethrough and about said objects;
   a plurality of slot means for feeding the cooling fluid to said conveyor means, each said slot means including at least one aperture for enabling vapor flow perpendicularly toward, onto and about said object on an axis parallel to the direction of motion of said conveyor means;
   a plenum adjacent said plurality of slot means; and
   at least one fan means in said tunnel chamber for causing a flow of said cooling fluid into said plenum and through said slot means with sufficient velocity to impinge upon and cool said objects and to recirculate said cooling fluid within said tunnel chamber.

2. The cooling tunnel system as recited in claim 1, wherein said cooling fluid is cryogenic carbon dioxide, and wherein plural nozzle means are fed from a source of pressurized carbon dioxide which, upon exiting said nozzle means, experiences sufficient expansion to create a mixture of carbon dioxide snow and carbon dioxide vapor, both said carbon dioxide snow and carbon dioxide vapor propelled by said at least one fan means to impinge upon said objects.

3. The cooling tunnel system as recited in claim 2, wherein each said fan means comprises a set of fan blades positioned approximately in a plane occupied by said slot means, said fan blades operated to draw said cooling fluid from beneath said conveyor means, up and into said plenum and against a deflecting surface that redirects said cooling fluid towards said slot means.

4. A cooling tunnel system for cooling objects, comprising:
   conveyor means for carrying sad objects in file alignment through a cooling tunnel, said conveyor means enabling a cooling fluid to pass therethrough and about said objects;
   a plurality of slot means for feeding the cooling fluid to an associated file of conveyor means, each said slot means including at least one aperture for enabling vapor flow onto and about objects in said associated file, said at least one aperture having a shape for directing and accelerating said cooling fluid toward said associated file of objects on an axis parallel to the direction of motion of said conveyor means;
   a plenum adjacent said plurality of slot means; and
   fan means for causing a flow of a cooling fluid into said plenum and through said slot means with sufficient velocity to impinge upon and cool said objects.

5. The cooling tunnel system as recited in claim 4, wherein said cooling fluid is a cryogenic fluid, and further comprising:
   plural nozzle means oriented along each of said slot means and positioned to introduce said cryogenic fluid into and through said slot means.

6. The cooling tunnel system as recited in claim 4, wherein said conveyor means enters and exits through a top wall of said cooling tunnel for limiting the infiltration of atmospheric gases.

7. The cooling tunnel system as recited in claim 4, wherein said cooling fluid is a cryogenic fluid, and further comprising:

tubes adjacent a plurality of said slot means and each of said tubes having a plurality of openings positioned for introducing said cryogenic fluid into and through said slot means.

8. The cooling tunnel system as recited in claim 4, wherein said at least one aperture has a shape for directing and accelerating said cooling fluid perpendicularly toward said associated file of objects.

9. A cooling tunnel system for cooling objects, comprising conveyor means for carrying said objects in file alignment through said tunnel system, said conveyor means enabling a cooling fluid to pass therethrouqh and about said objects;

a plurality of slot means for feeding the cooling fluid to an associated file of conveyor means, each said slot means including at least one aperture for enabling vapor flow onto and about objects in said associated file, said at least one aperture having a long dimension and a shorter dimension, said long dimension following said associated file of objects;

a plenum adjacent said plurality of slot means; and fan means for causing a flow of a cooling fluid into said plenum and through said slot means with sufficient velocity to impinge upon and cool said objects.

10. The cooling tunnel system as recited in claim 9, wherein said objects consist of eggs and said conveyor means is configured, as it moves said objects through said tunnel system, to rotate said eggs.

11. The cooling tunnel system as recited in claim 10, wherein said conveyor means comprises:

plural rollers arranged in ranks along said conveyor means, each roller including plural indented diameter segments which define, in conjunction with indented diameter segments of other rollers, plural regions for holding aligned files of eggs; and means for moving and rotating each of said plural rollers through said tunnel system to rotate said eggs in each file during said moving.

12. The cooling tunnel system as recited in claim 9, wherein mechanical refrigeration chills said cooling fluid.

13. The cooling tunnel system as recited in claim 12, wherein each aperture is bounded by opposed walls opening over an associated file of objects, said opposed walls acting to direct and accelerate cooling fluid flow therebetween.

14. The cooling tunnel system as recited in claim 9, wherein said cooling fluid is a cryogenic fluid, and further comprising:

plural nozzle means oriented along each of said slot means and positioned to introduce said cryogenic fluid into and through said slot means.

15. The cooling tunnel system as recited in claim 14, wherein said cooling fluid is cryogenic carbon dioxide, and wherein each said nozzle means is fed from a source of pressurized carbon dioxide which, upon exiting said nozzle means, experiences sufficient expansion to create a mixture of carbon dioxide snow and carbon dioxide vapor, both said carbon dioxide snow and carbon dioxide vapor propelled by said fan means to impinge upon said objects.

16. The cooling tunnel system as recited in claim 15, wherein each said nozzle means includes an exit orifice that is positioned within said slot means.

17. The cooling tunnel system as recited in claim 15, wherein each said nozzle means includes an exit orifice that is positioned in said plenum and above said slot means.

18. The cooling tunnel system as recited in claim 15, wherein each said fan means comprises a set of fan blades positioned approximately in a plane occupied by said slot means, said fan blades operated to draw said cooling fluid from beneath said conveyor means, up and into said plenum and against a deflecting surface that redirects said cooling fluid towards said slot means.

19. The cooling tunnel system as recited in claim 14, wherein said cooling fluid exits said aperture at a speed of about 10–20 meters per second.

20. The cooling tunnel system as recited in claim 14, wherein said conveyor means is operated to provide a transit time for said objects in said cooling tunnel of less than 2 minutes.

21. The cooling tunnel system as recited in claim 14, wherein said cooling fluid is a cryogenic fluid, and further comprising:

tubes adjacent a plurality of said slot means and each of said tubes having a plurality of openings positioned for introducing said cryogenic fluid into and through said slot means.

22. The cooling tunnel system as recited in claim 8, wherein each of said slot means includes at least one aperture for enabling vapor flow perpendicularly onto and about objects in said associated file.

* * * * *

UNITED STATES PATENT AND TRADEMARK OFFICE
CERTIFICATE OF CORRECTION

PATENT NO. : 6,334,330 B1                                    Page 1 of 1
DATED      : January 1, 2002
INVENTOR(S) : Gary Dee Lang, Theodore Hall Gasteyer III and Yeu-Chaun Simon Ho It is certified that error appears in the above-identified patent and that said Letters Patent is hereby corrected as shown below:

<u>Title page,</u>
Change "[76]" to -- [75] --, and immediately thereunder insert the following:
-- [73] Assignee: Praxair Technology, Inc. Danbury, CT --

Signed and Sealed this

Thirtieth Day of April, 2002

Attest:

JAMES E. ROGAN
*Attesting Officer*                *Director of the United States Patent and Trademark Office*